(12) United States Patent
Poutre et al.

(10) Patent No.: US 7,124,836 B2
(45) Date of Patent: Oct. 24, 2006

(54) KNOCK-ON SWEEP STRUCTURE

(75) Inventors: Benoit Jocelyn Poutre, Elkhart, IA (US); Richard Wayne Hook, West Des Moines, IA (US); James Thomas Noonan, Bondurant, IA (US); Donald Ray Peck, Clive, IA (US); Michael Sieben Egert, Polk City, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/082,284

(22) Filed: Mar. 17, 2005

(65) Prior Publication Data

US 2005/0161239 A1 Jul. 28, 2005

Related U.S. Application Data

(62) Division of application No. 10/690,354, filed on Oct. 21, 2003, now Pat. No. 7,070,007, which is a division of application No. 10/268,581, filed on Oct. 10, 2002, now Pat. No. 6,684,963.

(51) Int. Cl.
*A01B 15/00* (2006.01)

(52) U.S. Cl. ............... 172/762; 172/750; 172/751; 172/753

(58) Field of Classification Search ............ 172/750, 172/762, 751, 753, 772, 749, 772.5; 403/379.2, 403/374.1, 379.4; 37/458, 459, 455, 456
See application file for complete search history.

(56) References Cited

U.S. PATENT DOCUMENTS

| | | | | |
|---|---|---|---|---|
| 204,883 A * | 6/1878 | Carter | ............... | 172/338 |
| 1,081,961 A | 12/1913 | Hammers | ............... | 172/753 |
| 1,132,335 A | 3/1915 | Graves | ............... | 403/321 |
| 1,578,771 A | 3/1926 | Simons | ............... | 172/753 |
| 2,258,932 A * | 10/1941 | Jacobs | ............... | 403/325 |
| 2,757,595 A | 9/1956 | Clifford et al. | ............... | 97/198 |
| 2,877,061 A | 3/1959 | Blackwood | ............... | 403/317 |
| 3,061,021 A | 10/1962 | Shader | ............... | 172/750 |
| 3,104,724 A | 9/1963 | Pollock | ............... | 172/762 |
| 3,220,489 A * | 11/1965 | Repka | ............... | 172/750 |
| 3,223,452 A | 12/1965 | Krekeler | ............... | 299/109 |
| 3,536,147 A | 10/1970 | Norton | ............... | 172/719 |
| 3,563,318 A | 2/1971 | Eberthardt et al. | ............... | 172/750 |
| 3,773,114 A | 11/1973 | Griffin | ............... | 172/762 |
| 4,271,615 A | 6/1981 | Jones | ............... | 37/458 |
| 4,626,034 A | 12/1986 | Breuer et al. | ............... | 299/108 |
| 4,779,686 A | 10/1988 | Ryan | ............... | 172/730 |
| 4,799,555 A | 1/1989 | Badger | ............... | 172/751 |
| 5,007,484 A | 4/1991 | Johanson | ............... | 172/1 |

(Continued)

FOREIGN PATENT DOCUMENTS

GB 2 211 059 6/1989

*Primary Examiner*—Victor Batson

(57) ABSTRACT

Sweep retaining structure includes a retainer having a contact end biased towards the sweep. The sweep includes two or more spaced end-receiving areas to accommodate changes in the mounted sweep position. In one embodiment, the retainer is a wire made of spring steel having a contact end biased against the underside of the sweep. In one embodiment, the underside of the sweep includes a series of stepped portions. As the sweep is forced on the adapter on the shank, the contact end springs into retaining position on the stepped portion that aligns with the spring end when the sweep is in the mounted position. The sweep can be attached loosely by hand in an initial position with operating forces moving the sweep to a wedge locked position.

13 Claims, 6 Drawing Sheets

U.S. PATENT DOCUMENTS

| | | | |
|---|---|---|---|
| 5,134,793 A | 8/1992 | Bierwith | 37/458 |
| 5,465,796 A | 11/1995 | Buescher et al. | 172/762 |
| 5,558,165 A | 9/1996 | Bucher et al. | 172/721 |
| 5,711,378 A | 1/1998 | Yeager | 172/730 |
| 6,289,996 B1 | 9/2001 | Parish | 172/730 |
| 6,315,058 B1 | 11/2001 | Birkenbach et al. | 172/762 |
| 6,585,058 B1 * | 7/2003 | Zaun et al. | 172/762 |
| 6,684,963 B1 * | 2/2004 | Poutre et al. | 172/750 |
| 6,814,151 B1 * | 11/2004 | Peck et al. | 172/750 |

* cited by examiner

KNOCK-ON SWEEP STRUCTURE

This application is a divisional of application Ser. No. 10/690,354 filed 21 Oct. 2003 now U.S. Pat. No. 7,070,007, which is a divisional of application Ser. No. 10/268,581 filed 10 Oct. 2002, now U.S. Pat. No. 6,684,963.

FIELD OF THE INVENTION

The present invention relates generally to tillage tools and, more specifically, to a knock-on or fastenerless sweep with structure for preventing a sweep from falling off the end of a shank.

BACKGROUND OF THE INVENTION

Standard assemblies for implements such as chisel plows and field cultivators typically include a spring trip shank assembly extending downwardly to a tool-receiving end which mounts a shovel, point or sweep. Previously available mounting structure included bolts extending through holes in the tool and the shank to secure the tool. When the tool in such an assembly has to be replaced because of wear or damage, the bolts must be removed. Wear and corrosion of the bolts substantially hinders removal and often makes the replacement a difficult and time-consuming task.

Several solutions to the problem of easily and quickly replacing worn elements such as sweeps on shanks have been developed over the years, including adapter brackets providing a self-locking fit with a matching taper on knock-on sweeps, and frangible pins. Most retaining devices have suffered from one or more problems, including need for additional parts and the loss of sweeps when encountering high removal forces during transport and during rebounding of the shank from a tripped position. To reduce incidences of sweeps falling off the shanks in quick mount arrangements, some manufacturers have offered detent mechanisms such as a retaining clip in the form of a sheet metal stamping with a spherical protrusion that fits into a hole in the sweep. To release the sweep, a screwdriver or other tool is used to depress the clip and move the protrusion away from the hole. Other detent arrangements are shown, for example, in U.S. Pat. Nos. 3,061,021 and 6,289,996. Such detents generally help retain the sweeps on the shanks, but the forces exerted on a sweep, particularly forces exerted on deep tillage tools, can be so great that the sweep fails to stay on the shank. The geometry of most previously available sweep detent arrangements, including non-symmetrical mating surfaces on some, usually limits penetration of the retaining surface into the hole so that retaining forces are limited. Some care must be taken to align the protrusion with the hole, and part tolerances, variations in force used to mount the sweep, or lack of indexing of the clip relative to the shank can make such alignment troublesome. A relatively small, ramped contact area between the clip and the hole also increases the potential for losing a sweep. Soil moving up and around the stem portion of the sweep can move the clip from the detent position or wear away the clip until it is ineffective for holding the sweep on the shank. Extreme forces on the detent, such as those which occur during rebound, can also cause deformation of the detent. If the detent deforms, loosened sweeps can unacceptably dangle from the shank or be lost. A hefty detent construction or frequent detent replacements are therefore usually required.

In copending and commonly assigned U.S. application entitled KNOCK-ON SWEEP STRUCTURE AND TOOLS THEREFOR, Ser. No. 09/982,901, filed 19 Oct. 2001, a sweep assembly is described having a retainer fabricated from wire spring material and supported in a groove on the underside of the wedge support which mates with stem portion of the sweep. The end of the wire is biased toward a contact area on the top edge of a slot in the stem to prevent the sweep from slipping down away from the wedged mounted position. To remove the sweep, a tool is inserted through the slot to depress the retainer end, and the sweep is forced downwardly off the wedge support. A common problem with sweep detents is most have a fixed detent position, and manufacturing tolerances in the sweep and support can result in an overly loose or tight fit at the detent position. If there is excess looseness in the fit between the sweep and sweep adapter, the detent structure may have to bear substantially all the retaining load. If the fit is too tight, the sweep may never reach the detent position and may be lost during transport or at the end of a shank rebound. Providing the manufacturing tolerances necessary for proper alignment can make the cost of the device prohibitive. Often the operator must apply a very large driving force to the sweep with a hammer or other tool to provide the wedge lock or assure that the sweep reaches the detent position.

BRIEF SUMMARY OF THE INVENTION

It is therefore an object of the present invention to provide an improved sweep retaining structure for a knock-on sweep that overcomes one or more of the above-mentioned problems. It is another object to provide such an improved sweep retaining structure which is simple and inexpensive to manufacture and assemble and yet reliably holds the sweep on the shank and facilitates quick and easy attachment and removal of the sweep.

It is yet another object to provide an improved sweep retaining structure which provides reliable retention independently of manufacturing tolerances. It is a further object to provide such a structure having simplified and more reliable sweep attachment which requires less mounting force when initially attaching a sweep so the sweep can be attached by hand.

It is another object to provide an improved knock-on sweep for use with a sweep retainer. It is a further object to provide such a sweep having improved mating structure for a better fit with the retainer, even if there are relatively large manufacturing tolerances in the sweep mounting structures.

Sweep retaining structure includes a retainer having a contact end biased towards the sweep. The sweep includes two or more spaced retainer-receiving areas to accommodate manufacturing tolerances and facilitate hand mounting. In one embodiment, the retainer is a wire made of spring steel having a contact end biased against the underside of the sweep. The underside of the sweep includes a series of stepped portions or to provide a ratcheting function. As the sweep is slid onto the adapter on the shank, the contact end springs into a first retaining position on the stepped portion that aligns with the spring end. The first position maintains the sweep on the shank without need to forcibly drive the sweep onto the adaptor, and the attachment can be done by hand without tools. The force applied to the sweep during initiation of normal operation moves the sweep into a wedge locked position and provides a self-ratcheting effect for the retainer structure. If tolerances are such that the sweep moves upwardly on the shank beyond a central position, a stepped portion closer to the tip end of the sweep is engaged by the end. If tolerances provide a tighter fit so that the sweep does not move as far up the shank, a stepped portion closer to the upper end of the sweep is engaged.

To remove the sweep, a tool is used to engage and depress the retainer. In one embodiment, the tool fits behind the stem of the sweep so that a slot in the sweep adjacent the retainer is obviated for improved retainer operation and increased retainer life. The parts can be reversed in an alternate embodiment so that the stepped portions are on the shank or wedge adaptor and the retainer is on the sweep.

These and other objects, features and advantages of the present invention will become apparent to one skilled in the art upon reading the following detailed description in view of the drawings.

BRIEF DESCRIPTION OF THE INVENTION

DETAILED DESCRIPTION OF THE INVENTION

Figure 1:
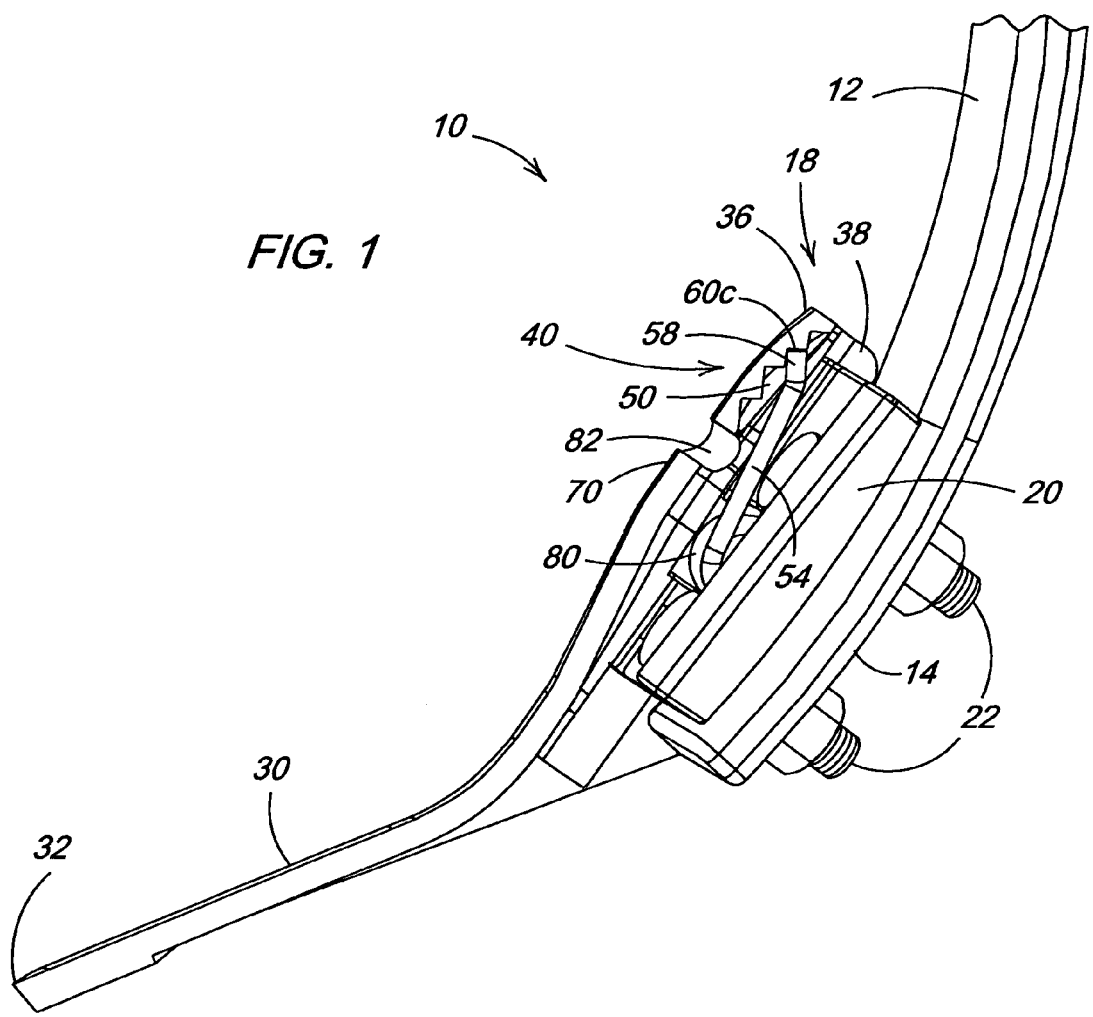
FIG. 1 is a side perspective view, partially in section, of a lower portion of a shank assembly including a sweep and sweep retaining structure.
Figure 2:
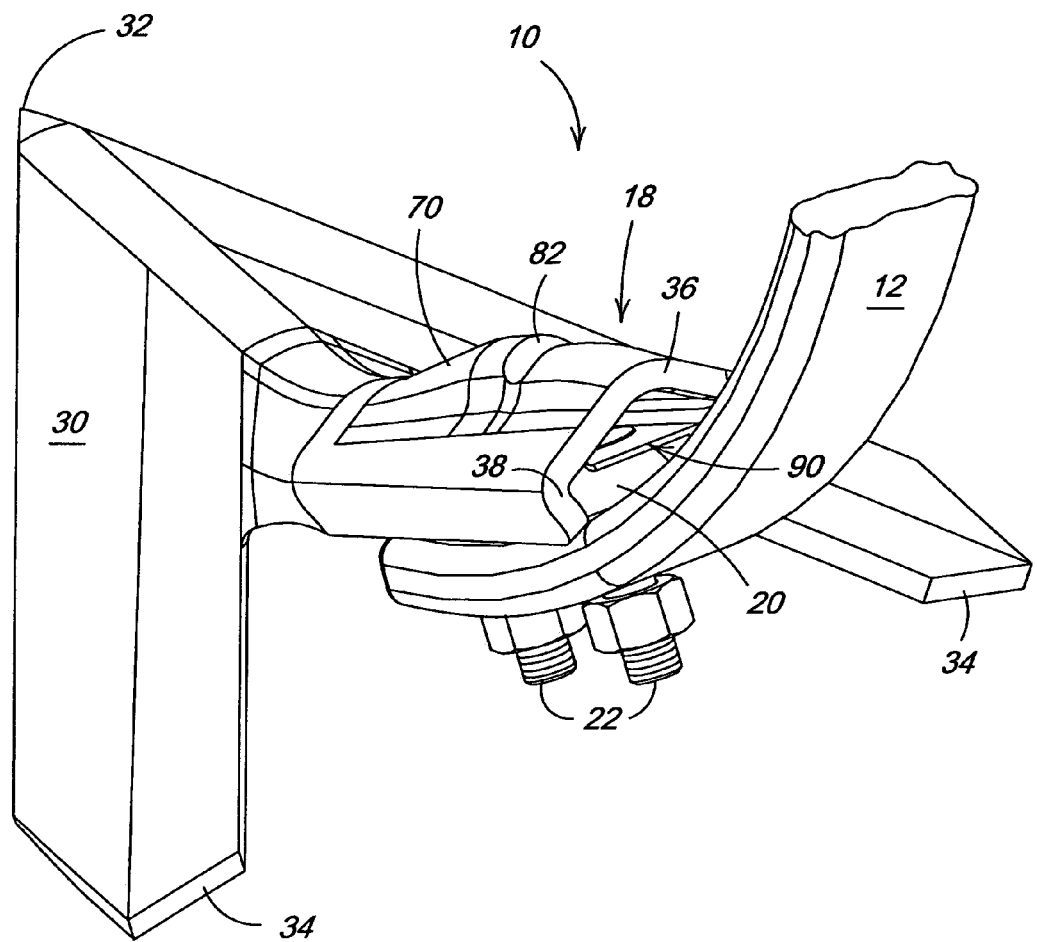
FIG. 2 is a top perspective view of a portion of the assembly of FIG. 1 showing the location for inserting a removal tool between the sweep and the sweep support.

Referring now to FIG. 1, therein is shown the lower portion of a spring trip shank assembly 10 including a shank 12 having a lower tool-mounting end 14 supporting a knock-on sweep assembly 18. The assembly 18 includes a wedge-shaped adapter-bracket or sweep support 20 having an aft face conforming to the forward face of the end 14. The support 20 is secured to the end by two plow bolts 22 extending through apertures in the sweep support 20 and corresponding apertures in the end 14 of the shank 12. An earthworking tool 30, shown as a cultivator sweep in FIGS. 1 and 2, includes a forwardmost tip or point 32 and opposed wing portions 34 diverging outwardly in the rearward direction. An downwardly and rearwardly concave sweep mounting portion or stem 36 includes edges 38 which wrap partially around the sweep support 20. The stem portion 36 provides a wedge fit between the tool 30 and the lower end 14 of the shank 12 when the tool 30 is urged upwardly onto the sweep support 20. The portion 36 is slid upwardly over the bracket 20 and then the tool 30 is forced upwardly and rearwardly to wedge the tool into the mounted position on the shank 12. Although the sweep support 20 is shown as a separate wedge-type support piece, other types of supports providing fastenerless, semi-fastenerless or fracturable connection of a tool to a tool support may also be used.

The sweep mounting portion 36 and the sweep support 20 firmly support the tool 30 on the end 14 without need for mounting bolts directly connected to the sweep 30. Since sweep mounting bolts are eliminated, the sweeps can be quickly driven from the support 20 and easily replaced. However, rebound forces and the like can loosen the wedge fit while operating in the field. The tool may also be lost in transport especially if it is not wedged on properly before being operated in the soil. To prevent loss of the tool 30 if the wedge fit is loosened during operation or transport, retaining structure indicated generally at 40 is provided. The normal forces operating on a sweep working in the ground tend to urge the sweep back into the wedge fit or mounted position if the sweep can be retained on the sweep support 20 after the undesired loosening.

Figure 3:
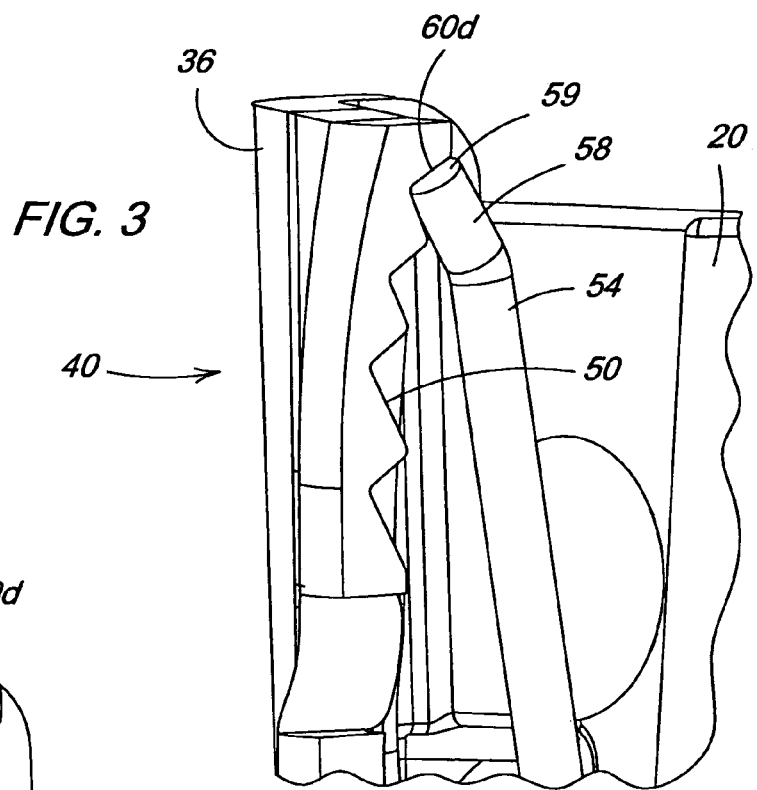
FIG. 3 is a view of the stepped retainer receiving portion of the sweep of FIGS. 1 and 2 and showing the retainer at an initial attaching location relative to the retainer-receiving portion.
Figure 6:
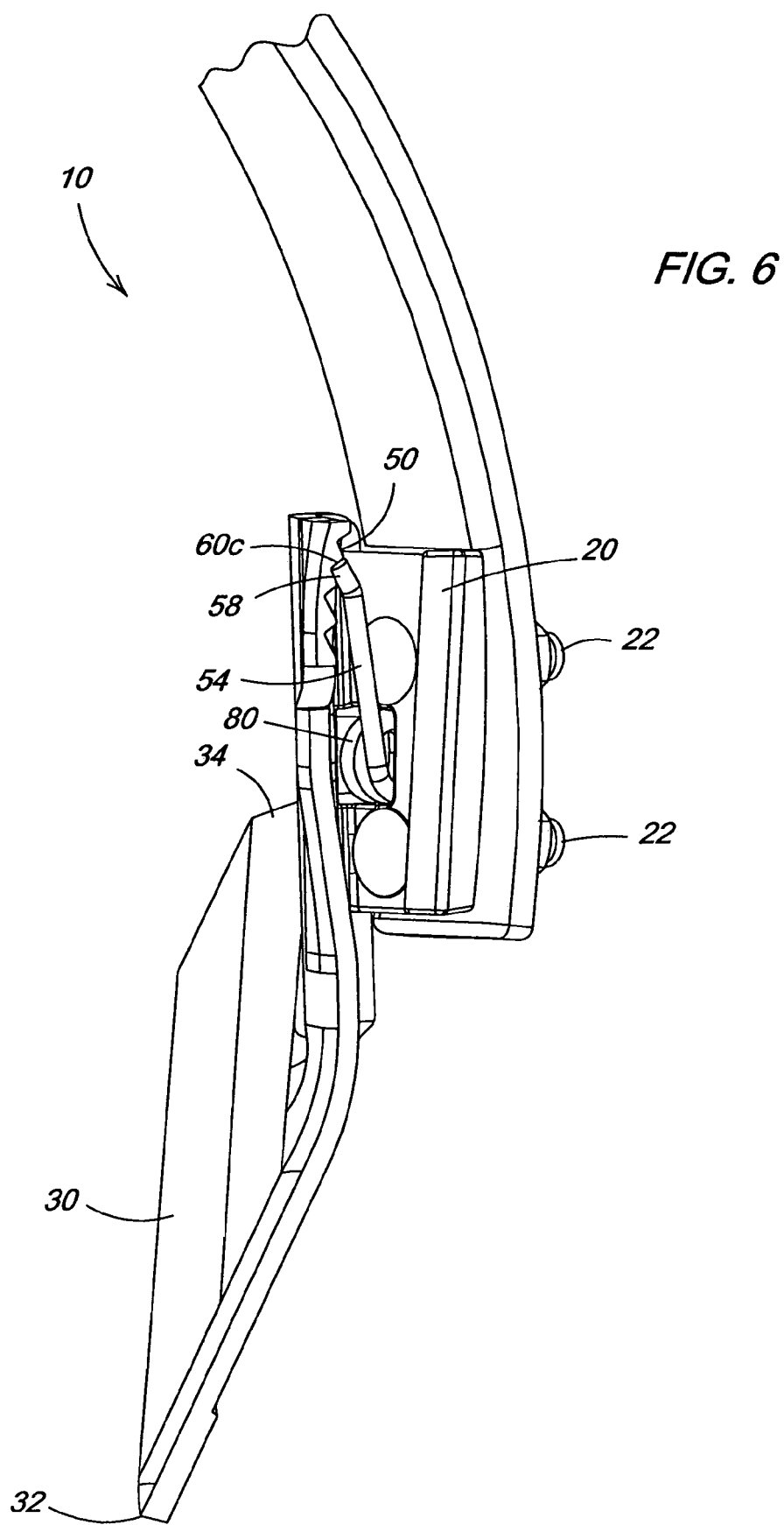
FIG. 6 is a front perspective view of the lower portion of the shank assembly.

The sweep retaining structure 40 includes an elongated contact area 50 located on the underside of the sweep at the upper portion of the stem or attaching portion 36. A retainer 54 is carried by the sweep support 20 and includes a contact end 58 which is offset forwardly and above the top or forward surface of the sweep support 20. The contact end 58 includes a flat contact area 59 and is biased towards the underside of the stem 36. The end 58 abuts or lies closely adjacent one of a plurality of spaced, flat contact areas 60a, 60b, 60c and 60d in a loss prevention position when the sweep 30 is in the mounted position or in an initial unwedged attachment position (FIG. 3). As shown in FIGS. 1 and 6, the end 58 abuts a central contact area 60c. However, if tolerances between the stem portion 36 and the support 20 are such that a tighter fit is provided and the sweep wedges in the mounted position sooner on the shank (near the initial position of FIG. 3), an area (60d) above the central area will receive the end 58 in retaining relationship. If tolerances are such that the fit is looser, the sweep will move farther up relative to the shank, and an area (60a in FIG. 4) below the central area 60c will receive the end 58 for shank retention. The surfaces of the area 60c and the contact area 59 are generally parallel to each other when in contact. The contact prevents the sweep from moving a substantial distance away from the mounted position until the end 58 is moved toward the sweep support 20 against the bias.

Figure 4:
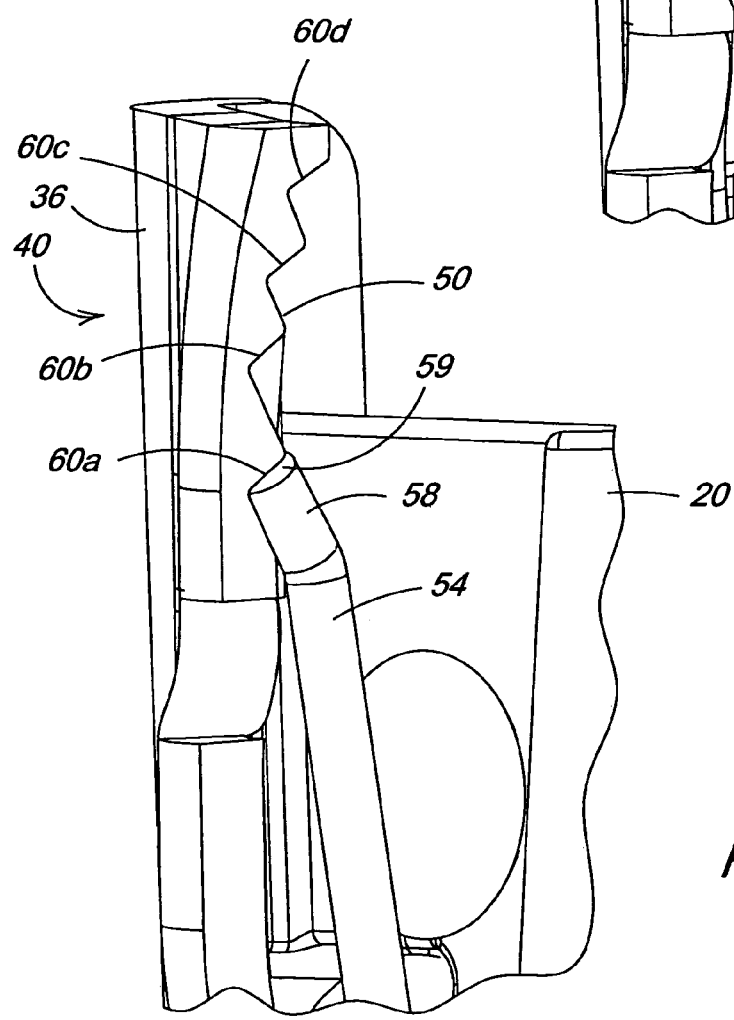
FIG. 4 is a view similar to that of FIG. 3 but showing the retainer at a location wherein wedging occurs at a relatively high mounted location.

The stem 36 of the sweep 30 includes a raised or blind channel area 70 which defines a retainer guiding and support area on the underside of the raised area. The underside of the raised area 70 is concave downwardly and rearwardly and opens in the rearward direction towards the support 20. The contact areas 60a–60d are formed on underside of the area 70 and define a plurality of spaced one-way locking positions. As shown in FIGS. 1, 3 and 4, the area 50 is stepped to define the areas 60a–60d in a blind recess so that soil and debris do not impinge or build up on the contact area during operation in the field.

Figure 7:
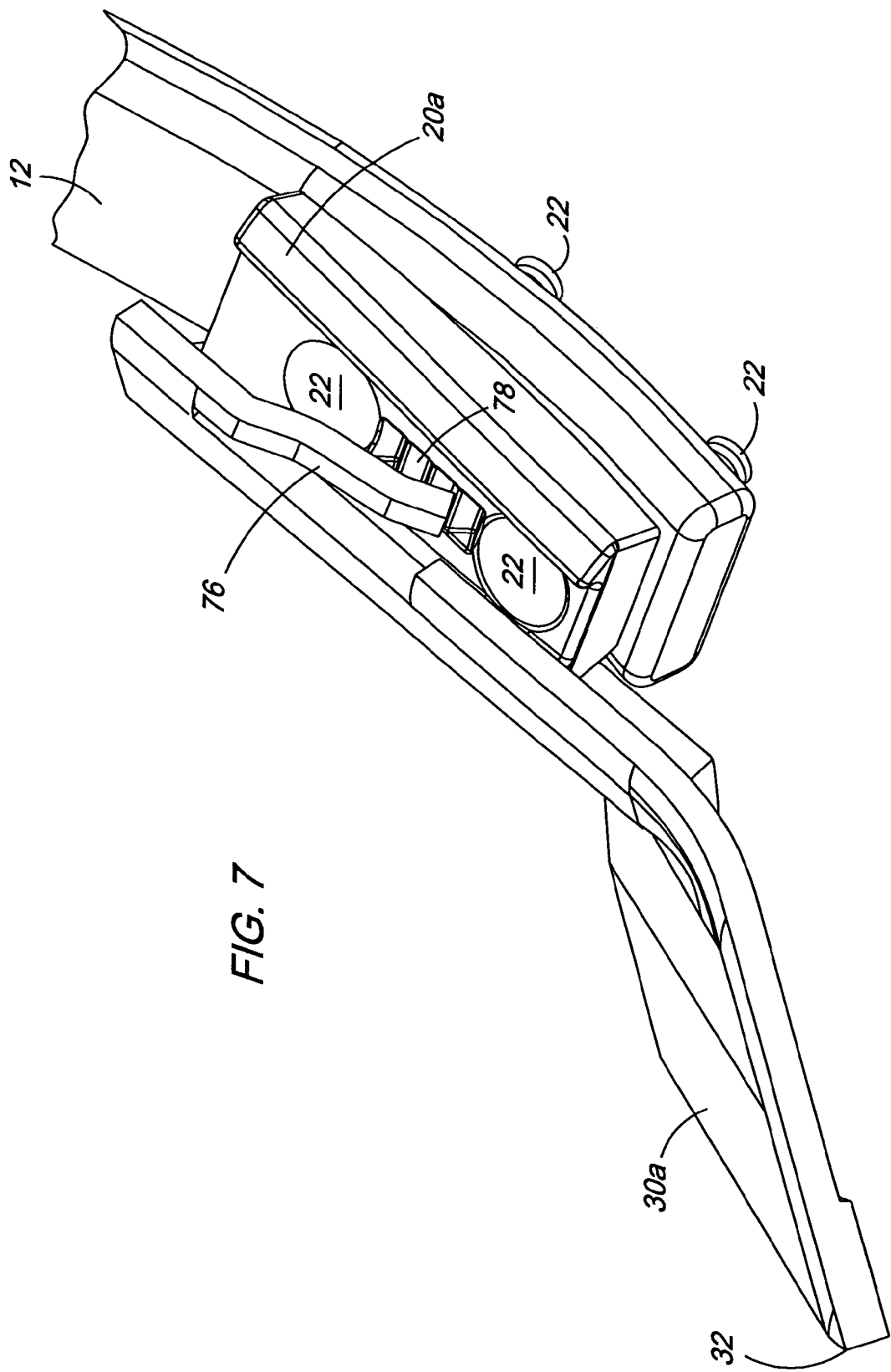
FIG. 7 is a perspective view, partially in section, showing an alternate embodiment of the sweep retaining structure.

As the sweep 30 is initially slipped onto the support 20 by hand, the retainer is urged downwardly and moves into the area 60d to loosely hold the sweep in an initial non-wedging position on the support 20. When the implement is operated in the soil, the forces acting on the sweep 30 force the sweep into a wedge lock position on the support 20. During this upward movement, as each apex of the stepped area passes the end 58, the retainer 54 springs into the next adjacent recess so the end 58. The retainer provides the retaining function against the corresponding one of the areas 60a–60d if the sweep begins to move from the mounted position. Alternatively, the retainer may be provided on the sweep, such as in the form of a downwardly biased tab or spring member (see 76 of FIG. 7) on sweep 30a, with a support 20a including spaced receiving structure with abutment surface or ratchet-defining structure 78 for engaging the tab or spring member 76.

The retaining structures described above provide a one-way or ratchet type securing arrangement with multiple retaining positions so that the abutment position is closely adjacent the mounted position and sweep travel relative to the support 20 remains small if the sweep begins moving from the fully mounted wedged position regardless of the tolerances between components. The offset retaining area allows easy initial hand mounting of the sweep and retention of the sweep until the operating forces move the sweep into a wedge locked mounting position.

As shown in FIGS. 1, 3, 4 and 6, the retainer 54 is a bent spring wire supported by an area 80 at a central location on the support 20. As the sweep 30 is forced upwardly and rearwardly onto the sweep support 20, the end 58 springs into the channel-shaped underside of the area 70. If the sweep 30 begins to move downwardly away from the wedged position, the contact between the contact area 59 of the end 58 and the corresponding one of the contact areas 60a–60d holds the sweep closely adjacent the fully wedged position until the soil forces acting on the sweep during operation again wedge the sweep into the locked position. The channel-shaped underside at 70 also supports the end 58 of the wire retainer 54 at points generally on-axis to help the retainer resist bending moments that would otherwise occur when strong sweep-removing forces such as rebound forces are acting to dislodge the sweep. The opposite raised area on the top of the sweep directs soil outwardly around the sweep retaining structure 40 to limit abrasive wear in that area.

Figure 5:
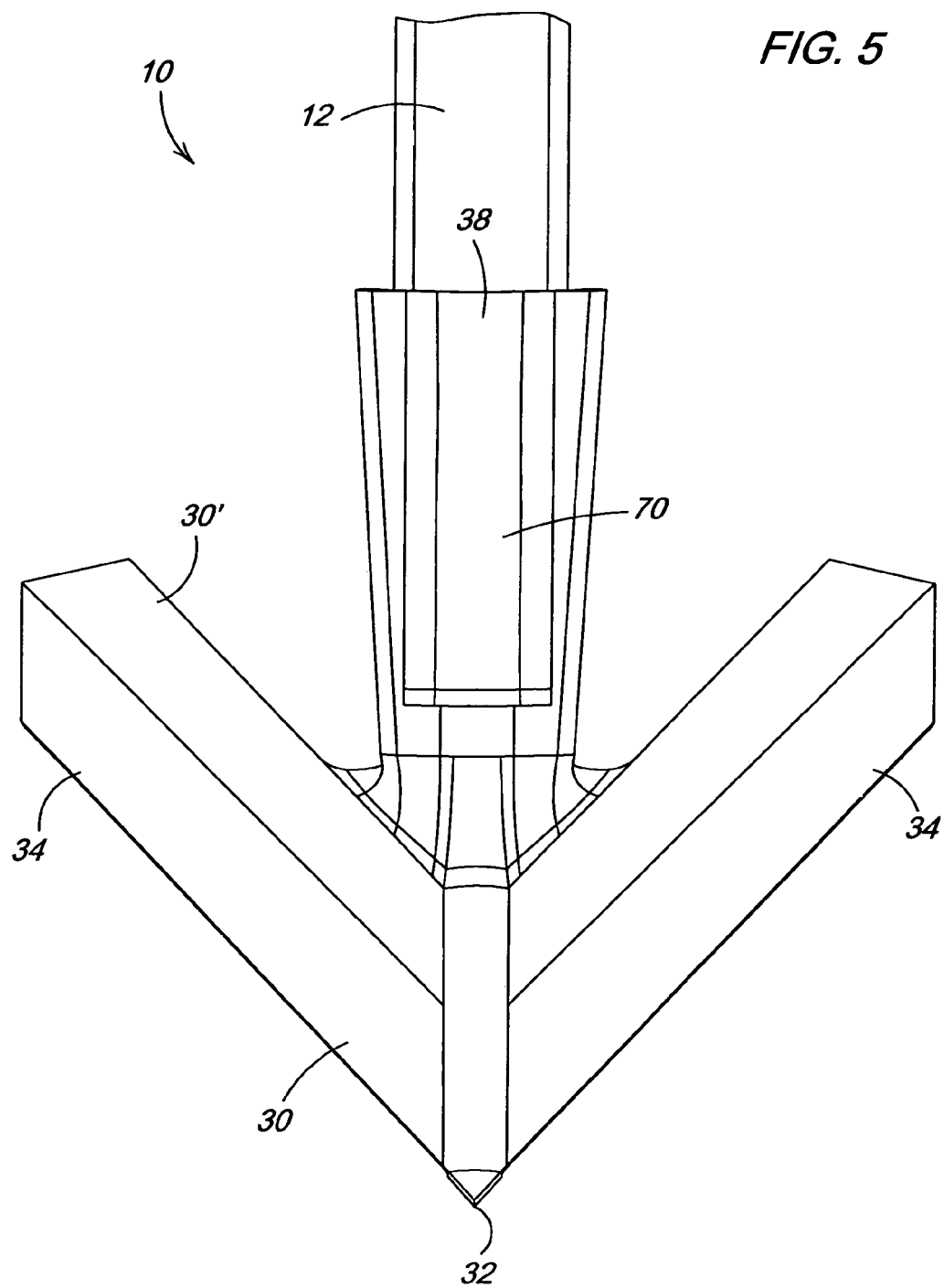
FIG. 5 is a front view of a sweep without an aperture in the mounting stem.

To remove the sweep 30, a tool may be inserted through a hole 82 in the stem 36 to urge the retainer 54 downwardly away from abutment with the contact area. With the retainer depressed, a sharp downward blow with a hammer or other downward pressure from a removal tool will drive the sweep from its wedged mounted position on the support 20. In the embodiment shown in FIG. 5, no hole is provided in the stem 36, and a retainer depressing tool is inserted in an accommodation space 90 (FIG. 2) behind the stem to engage a central location of the retainer 54. The tool can then be twisted to urge the retainer out of sweep-retaining relationship with the underside of the stem 36. Eliminating the hole in the stem 36 reduces dirt build-up and wear in the retaining area.

Having described the preferred embodiment, it will become apparent that various modifications can be made without departing from the scope of the invention as defined in the accompanying claims.

We claim:

1. Retaining structure for a knock-on sweep assembly for a tillage implement sweep having a forward end and a sweep mounting portion located rearwardly of the forward end, the retaining structure including:
   a wedge support adapted for mating with the sweep mounting portion and providing a tight but releasable wedged fit position, the wedge fit position dependent on tolerances between the wedge support in the sweep mounting position;
   a retainer supported by the wedge support and biased into a locking position relative to the sweep to prevent movement of the sweep from the wedge fit position;
   wherein the sweep mounting portion includes spaced retainer-receiving locations defining a plurality of retainer contact areas to engage the retainer at different wedge fit positions; and
   wherein the retainer engages one of the retainer contact areas, the contact area engaged dependent upon the wedge fit position.

2. The retaining structure as set forth in claim 1 wherein the retainer comprises a spring member having an end biased towards the spaced retainer-receiving locations.

3. Retaining structure for a knock-on sweep assembly for a tillage implement sweep having a forward end and a sweep mounting portion located rearwardly of the forward end, the retaining structure including:
   a wedge support adapted for mating with the sweep mounting portion and providing a tight but releasable wedged fit position, the wedge fit position dependent on tolerances between the wedge support in the sweep mounting position;
   a retainer supported by the wedge support and biased into a locking position relative to the sweep to prevent movement of the sweep from the wedge fit position;
   wherein the sweep mounting portion includes spaced retainer-receiving locations to engage the retainer at different wedge fit positions;
   wherein the retainer comprises a spring member having an end biased towards the spaced retainer-receiving locations; and
   wherein the spaced retainer-receiving portions comprise a stepped area on the mounting portion of the sweep.

4. The retaining structure as set forth in claim 3 wherein the retainer includes an end having a flat surface and the stepped area includes a plurality of spaced flats generally parallel to the flat surface.

5. Retaining structure for a knock-on sweep assembly for a tillage implement sweep having a forward end and a sweep mounting portion located rearwardly of the forward end, the retaining structure including:
   a wedge support adapted for mating with the sweep mounting portion and providing a tight but releasable wedged fit position, the wedge fit position dependent on tolerances between the wedge support in the sweep mounting position;
   a retainer supported by the wedge support and biased into a locking position relative to the sweep to prevent movement of the sweep from the wedge fit position;
   wherein the sweep mounting portion includes spaced retainer-receiving locations to engage the retainer at different wedge fit positions;
   wherein the retainer comprises a spring member having an end biased towards the spaced retainer-receiving locations; and
   wherein the retainer comprises a wire and the sweep includes a channel-shaped underside area supporting the wire to help the wire resist bending moments.

6. Retaining structure for a knock-on sweep assembly for a tillage implement sweep including a sweep mounting portion, the retaining structure comprising:
   a friction support including means for providing a tight but releasable friction fit position between the friction support and the sweep mounting portion, the friction fit position dependent on tolerances between the friction support and the sweep mounting portion; and
   wherein the friction support includes one-way ratchet structure providing a plurality of locking positions for preventing movement of the sweep mounting portion off the friction support; and
   wherein the one-way ratchet structure includes means for positively engaging the sweep mounting portion at different friction fit positions to thereby facilitate the friction fit and preventing substantial movement of the sweep from the friction fit position.

7. The retaining structure as set forth in claim 6 wherein the retainer comprises a spring member and the means for positively engaging the sweep mounting portion includes a spring end biased into engagement with the sweep mounting portion.

8. The retaining structure as set forth in claim 7 wherein the spring member comprises a wire spring.

9. The retaining structure as set forth in claim 7 wherein the spring end comprises means for abutting one of a plurality of spaced flats located on the sweep mounting portion.

10. The retaining structure as set forth in claim 8 wherein the retainer comprises a wire and includes a guide portion adapted for engaging an underside area of the sweep mounting portion for support of the wire to help the wire resist bending moments.

11. The retaining structure as set forth in claim 6 wherein one-way ratchet structure comprises abutment surface structure located on the friction support.

12. The retaining structure as set forth in claim 11 wherein the abutment surface structure includes a plurality of steps for engaging the sweep mounting portion.

13. The retaining structure as set forth in claim 6 wherein one-way ratchet structure includes means for engaging tab structure on the sweep.

* * * * *